(12) United States Patent
Imasaka

(10) Patent No.: US 12,090,647 B2
(45) Date of Patent: Sep. 17, 2024

(54) LINEAR MOTION MECHANISM

(71) Applicant: FANUC CORPORATION, Yamanashi (JP)

(72) Inventor: Kousuke Imasaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/013,448

(22) PCT Filed: Jul. 5, 2021

(86) PCT No.: PCT/JP2021/025235
§ 371 (c)(1),
(2) Date: Dec. 28, 2022

(87) PCT Pub. No.: WO2022/009816
PCT Pub. Date: Jan. 13, 2022

(65) Prior Publication Data
US 2023/0294309 A1   Sep. 21, 2023

(30) Foreign Application Priority Data

Jul. 8, 2020   (JP) .................................. 2020-117777

(51) Int. Cl.
*B25J 18/02*   (2006.01)
*F16G 13/20*   (2006.01)

(52) U.S. Cl.
CPC ............. *B25J 18/025* (2013.01); *F16G 13/20* (2013.01)

(58) Field of Classification Search
CPC ......... B25J 18/025; F16G 13/20; E04H 12/34
See application file for complete search history.

(56) References Cited

U.S. PATENT DOCUMENTS

| 8,925,405 B2 | 1/2015 | Kawabuchi et al. |
| 2012/0024091 A1 | 2/2012 | Kawabuchi et al. |
| 2019/0331204 A1* | 10/2019 | Cai ..................... F16H 19/0663 |

FOREIGN PATENT DOCUMENTS

| EP | 0799788 A1 | 10/1997 |
| JP | S62-241692 A | 10/1987 |

(Continued)

OTHER PUBLICATIONS

International Search Report issued in PCT/JP2021/025235 mailed on Sep. 14, 2021 with English Translation (7 pages).

(Continued)

*Primary Examiner* — William C Joyce
(74) *Attorney, Agent, or Firm* — Nakanishi IP Associates, LLC

(57) ABSTRACT

A linear motion mechanism includes: a plurality of cylinders assembled telescopically in multiple stages; a block row with a head block connected to the head cylinder; guide rails and configured to accommodate the block row in a circular arc shape; a torque generating unit configured to generate torque for feeding the block row from the guide rails and pulling back the block row from the guide rails; and an arm for transmitting the torque generated by the torque generating unit to the block row. A rotary shaft of the torque generating unit is arranged at a circular arc center of the guide rails, one end of the arm is connected to a rotary shaft of the torque generating unit, and another end thereof is connected to a rearmost block among a plurality of blocks.

4 Claims, 4 Drawing Sheets

(56) References Cited

FOREIGN PATENT DOCUMENTS

| | | |
|---|---|---|
| JP | H04-029660 A | 1/1992 |
| JP | H05-142368 A | 6/1993 |
| JP | H08-169693 A | 7/1996 |
| JP | 2001-165217 A | 6/2001 |
| JP | 2001-253689 A | 9/2001 |
| JP | 5317362 B2 | 10/2013 |
| JP | 2018-015885 A | 2/2018 |
| KR | 10-2006-0007232 A | 1/2006 |
| WO | 2010-070915 A1 | 6/2010 |
| WO | WO 2013/124963 * | 8/2013 |

OTHER PUBLICATIONS

Written Opinion of the International Searching Authority issued in PCT/JP2021/025235 mailed on Sep. 14, 2021 with English Translation (6 pages).

Office Action issued in Japanese Patent Application No. 2022-535307 mailed on Feb. 6, 2024 (10 pages).

* cited by examiner

LINEAR MOTION MECHANISM

TECHNICAL FIELD

Embodiments relate generally to a linear motion mechanism.

BACKGROUND

A linear motion mechanism is an effective mechanism for improving the safety of a robot device because it can eliminate the need for an elbow joint of the robotic device, and is expected to be applied to collaborative robots that can work in collaboration with humans. As the linear motion mechanism, there is known a structure in which an arm part as a columnar body is configured by joining a first frame row of a plurality of first frames (flat plates) coupled bendably by a rotary shaft and a second frame row of a plurality of second frames (blocks) similarly coupled bendably, and the first and second frame rows are separated and vertically accommodated in a support portion as bendable row bodies (Patent Literature 1).

CITATION LIST

Patent Literature

Patent Literature 1: Japanese Patent No. 5317362

DETAILED DESCRIPTION

Figure 1:
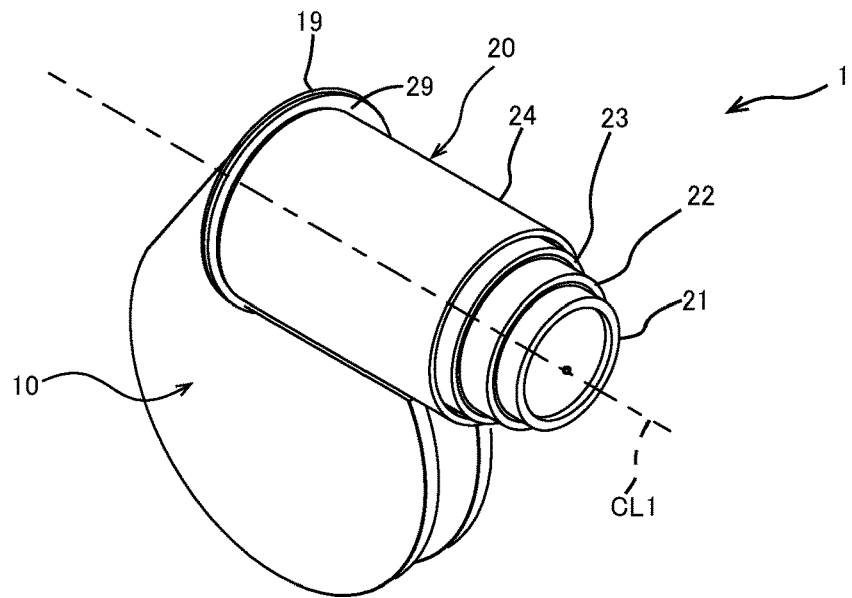
FIG. 1 is a perspective view of a linear motion telescopic mechanism during contraction according to an embodiment.

A linear motion mechanism according to one aspect of the present disclosure includes: a plurality of linear motion elements assembled telescopically in multiple stages; a block row including a plurality of blocks coupled in a row, a head block among the plurality of blocks being connected to a head linear motion element among the plurality of linear motion elements; an accommodating portion configured to accommodate the block row in a circular arc • shape; a torque generating unit configured to generate torque for feeding the block row from the accommodating portion in order to extend the linear motion elements and pulling back the block row to the accommodating portion in order to contract the linear motion elements; and an arm for transmitting the torque generated by the torque generating unit to the block row. A rotary shaft of the torque generating unit is arranged at a circular arc center of the accommodating portion, one end of the arm is connected to the rotary shaft of the torque generating unit, and another end thereof is connected to a rearmost block among the plurality of blocks.

Hereinafter, a linear motion mechanism according to the present embodiment will be described with reference to the drawings. In the following description, constituent elements having substantially the same function and configuration are denoted by the same reference numeral, and repetitive descriptions will be given only where necessary. The linear motion mechanism according to the present embodiment can be used alone or as a linear motion joint of a robot arm mechanism.

Figure 2:
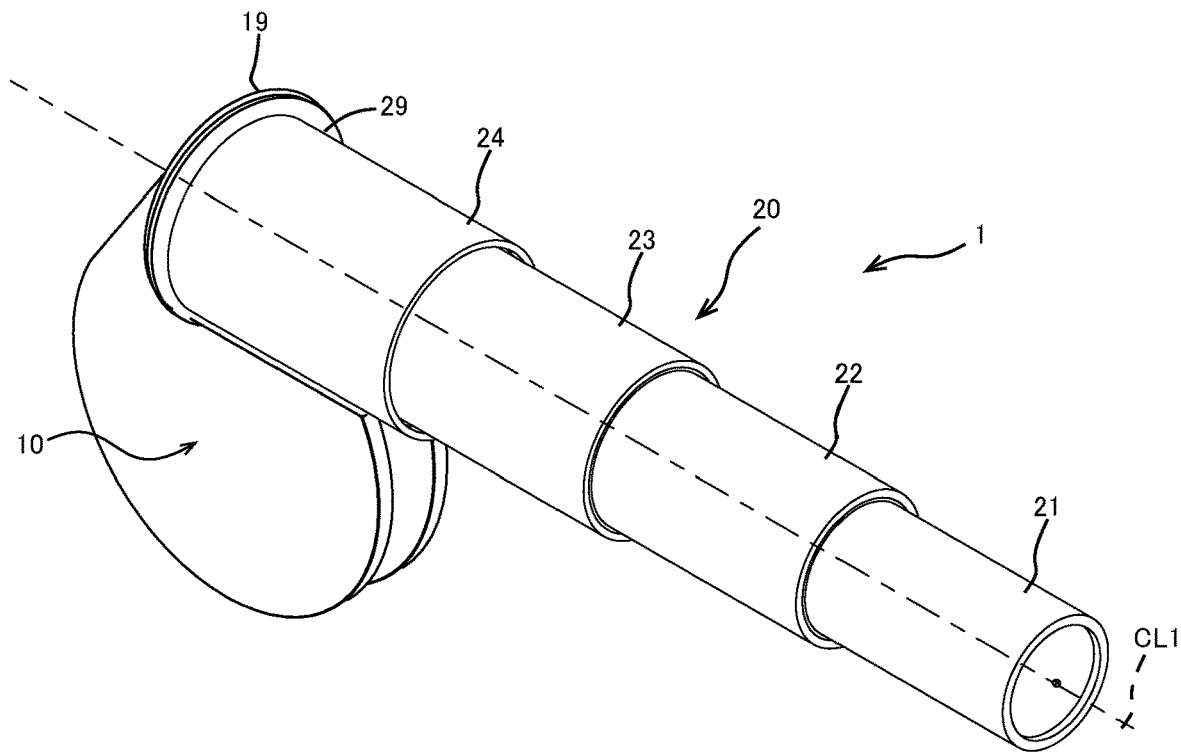
FIG. 2 is a perspective view of the linear motion telescopic mechanism during extension.

As shown in FIGS. 1 and 2, a linear motion mechanism 1 has a telescopic linear motion arm 20. Typically, the linear motion arm 20 is composed of a plurality of linear motion elements assembled in multiple stages. In the present embodiment, the linear motion arm 20 is composed of a plurality of, here four linear motion elements (hereinafter referred to as cylinders) 21, 22, 23, and 24 assembled in a telescopic structure (multi-stage nested structure). Typically, the cylinders 21, 22, 23, and 24 are circular cylinders. However, each cylinder may be a square cylinder. The linear motion arm 20 is supported by a housing 10.

Figure 3:
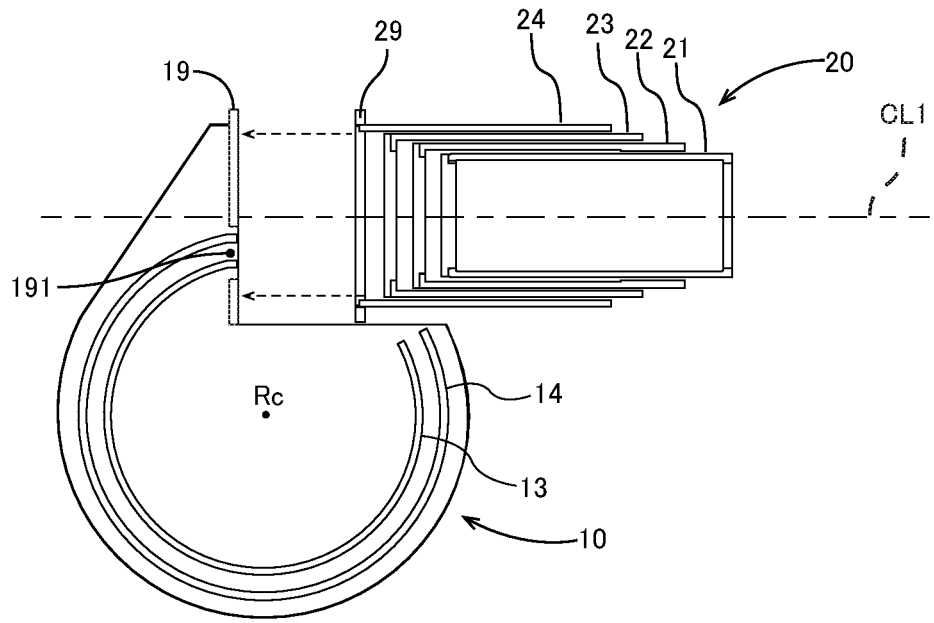
FIG. 3 is a side view showing the linear motion telescopic mechanism in FIG. 1 in a state where a housing and a linear motion arm are separated.
Figure 4:
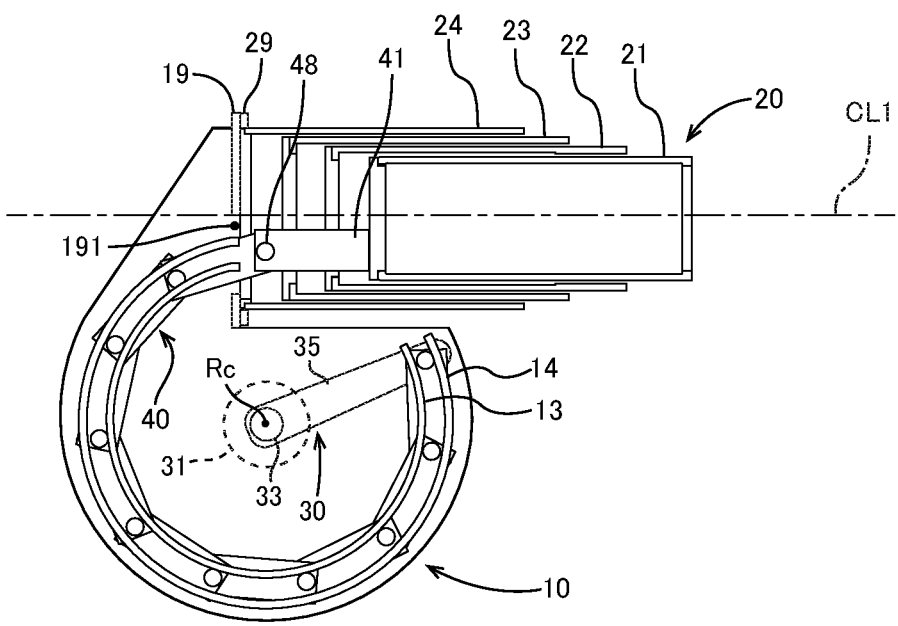
FIG. 4 is a side view showing an internal structure of the linear motion telescopic mechanism during contraction.
Figure 5:
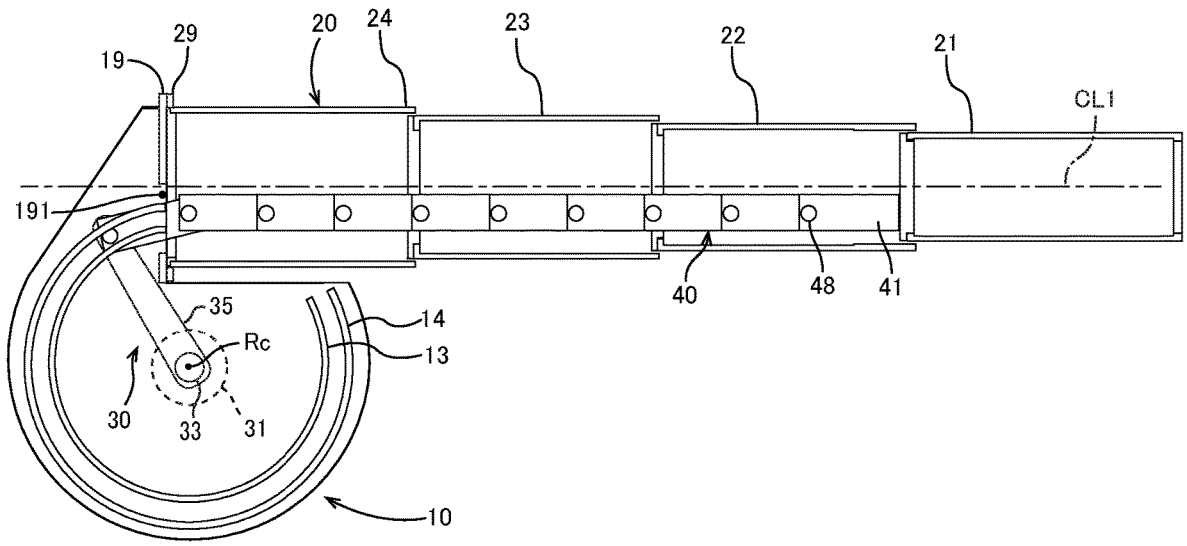
FIG. 5 is a side view showing an internal structure of the linear motion telescopic mechanism during extension.

Typically, the housing 10 is configured in a substantially short circular cylindrical shape with approximately a ¼ circle cut out at the top. As shown in FIG. 3, a mount plate 19 is attached to the cut-out portion at the top of the housing 10. A flange 29 formed at the rear end of the linear motion arm 20, that is, the rear edge of the rearmost cylinder 24 is joined to the mount plate 19, and is fastened by bolts or the like. An opening 191 is formed in the mount plate 19. The inside of the housing 10 thereby communicates with the hollow interior of the cylinders 21, 22, 23, and 24. As shown in FIGS. 4 and 5, a block row 40 is inserted into an internal space communicating from the inside of the housing 10 to the hollow interior of the cylinders 21, 22, 23, and 24. The opening 191 serves as an entrance for the block row 40 to enter and exit the housing 10. The block row 40 is formed by coupling a plurality of blocks 41 in a row. The head block 41 of the block row 40 is connected to the head cylinder 21 of the cylinders 21, 22, 23, and 24.

The housing 10 includes therein an accommodating portion for accommodating the block row 40 along a circular arc trajectory centered on a housing center Rc. The accommodating portion has a first member for regulating the block row 40 from one side and a second member for regulating the block row 40 from the other side. Typically, a pair of guide rails 13 and 14 serving as an accommodating portion are provided as the first member on the inner surface of one side plate of the housing 10. Similarly, a pair of guide rails 13 and 14 are provided as the second member on the inner surface of the other side plate of the housing 10. The guide rails 13 and 14 are configured to guide cam followers 48 and 49 attached to a block 41 to be described later from the inside and the outside, respectively. Typically, the guide rails 13 and 14 are each configured as a wire body curved in a circular arc shape, and arranged such that the circular arc center coincides with the housing center Rc. The distance between the guide surface of the outer guide rail 14 and the guide surface of the inner guide rail 13 is equivalent to or slightly larger than the diameter of the cam followers 48 and 49. In a state where the linear motion arm 20 is most contacted, the block row 40 is mostly accommodated inside the housing 10. The block row 40 is accommodated in the housing 10 in a circular arc shape centered on the housing center Rc by being regulated by the guide rails 13 and 14.

(Drive Mechanism Inside Housing 10)

A drive mechanism 30 that realizes the feeding operation and pulling back operation of the block row 40 is provided inside the housing 10. The drive mechanism 30 includes a torque generating unit and a rotary arm 35. The torque generating unit includes a motor (not shown) and a reduction gear 31 for reducing the rotational speed of the motor. The reduction gear 31 is arranged so that the rotational center of its rotary shaft 33 coincides with the housing center Rc. One end (proximal end) of a rod-like rotary arm 35 is connected to the rotary shaft 33 of the reduction gear 31. The other end (distal end) of the rotary arm 35 is connected to the rearmost block 41. Details of the connection structure between the distal end of the rotary arm 35 and the rearmost block 41 will be described later.

(Description of Operation of Linear Motion Mechanism)

According to the drive mechanism 30 configured as described above, torque generated by the motor, the reduction gear 31, and the rotary shaft 33 is transmitted to the block row 40 by the rotary arm 35, whereby the block row 40 can be fed from the inside of the housing 10 to the inside of the linear motion arm 20 and pulled back from the inside of the linear motion arm 20 to the inside of the housing 10.

Specifically, as the motor rotates in the forward direction, the distal end of the rotary arm 35 rotates in the forward direction around the housing center Rc. The rearmost block 41 connected to the distal end of the rotary arm 35 is moved together with the distal end of the rotary arm 35 in a direction (forward direction) approaching the opening 191 along a circular arc trajectory defined by the guide rails 13 and 14. As the rearmost block 41 moves, the blocks 41 are fed, sequentially from the head block 41, from the inside of the housing 10 through the opening 191 to the inside of the linear motion arm 20, and the head block 41 is moved forward along an axis parallel to an arm center line (cylinder center line) CL1. Since the head block 41 is connected to the head cylinder 21, the other cylinders 21, 22, and 23 are pulled out one after another from the rearmost cylinder 24 fixed to the housing 10 as the head block 41 moves forward, and as a result, the linear motion arm 20 is extended forward along the arm center line CL1.

As the motor rotates in the reverse direction, the distal end of the rotary arm 35 rotates in the reverse direction around the housing center Rc. The rearmost block 41 connected to the distal end of the rotary arm 35 is moved together with the distal end of the rotary arm 35 in a direction (reverse direction) away from the opening 191 along the circular arc trajectory defined by the guide rails 13 and 14. As the rearmost block 41 moves, the blocks 41 are pulled back, sequentially from the rear block 41, from the inside of the linear motion arm 20 through the opening 191 to the inside of the housing 10, and the head block 41 is moved backward along the axis parallel to the arm center line CL1. As the head block 41 moves backward, the cylinders 21 are accommodated in the rear cylinders sequentially from the head cylinder, and as a result, the linear motion arm 20 is contracted backward along the arm center line CL1.

As described above, the block row 40 constitutes a part of an actuator that drives the extension and contraction of the linear motion arm 20. Since the linear motion arm 20 is composed of a plurality of cylinders 21, 22, 23, and 24 assembled in a multi-stage nested structure, and the actuator for the extension and contraction is composed of a single block row 40, the structure is simplified, the weight is reduced, and the strength of the linear motion arm 20 is synergistically improved by the multi-stage nested structure and the block row.

In addition, since the rotary arm 35 of the drive mechanism 30 is connected to the rearmost block 41 of the block row 40, the block row 40 can be fed into the linear motion arm 20 until the rotary arm 35 connected to the rearmost block 41 reaches the opening 191. Thus, the extension distance of the linear motion arm 20 can be extended to a length substantially equivalent to the total length of the block row 40. Further, the drive mechanism 30 which pushes the block row 40 out of the housing 10 and pulls the block row 40 back to the housing 10 by utilizing the rotation of the rotary arm 35 is superior to a drive mechanism which feeds the block row 40 out of the housing 10 and pulls the block row 40 back to the housing 10 by meshing a gear formed on the block 41 with a drive gear in the following points. That is, since gear-specific failures such as a meshing failure do not occur, the risk of drive failure of the block row 40 can be reduced. In addition, since a gear is not used in the transmission mechanism for transmitting the rotational torque of the motor to the block row 40, generation of chips due to loss of gear teeth or the like can be suppressed. As a result, it can be utilized in food production lines with strict hygiene control. Since a gear need not be formed on the block 41, the block 41 need not be formed of a material having high rigidity, and the cost of the block itself can be reduced and the weight of the block 41 can be reduced. In particular, in the case where the gear of the block 41 is meshed with the drive gear on the circular arc trajectory, it is necessary to form a precise gear curved in a circular arc shape, and the component cost of the block 41 is even higher. As described above, the effect of cost reduction by not forming a gear on the block 41 is even greater. On the other hand, when the gear of the block 41 is meshed with the drive gear on the linear trajectory, it is necessary to provide the drive gear inside the linear motion arm 20 in which the block row 40 is aligned linearly, so that the size of the linear motion arm 20 increases. According to the configuration of the present application, the movement of the block row 40 can be driven with a very simple structure in which the block row 40 is pushed and pulled by the rotary arm 35. In addition, since the main constituent elements of the drive mechanism 30 can be concentrated near the center of the circular arc trajectory accommodating the block row 40, unnecessary increase in size and weight of the linear motion mechanism 1 can be suppressed, and the degree of freedom in arrangement of the other components can be improved.

Figure 6:
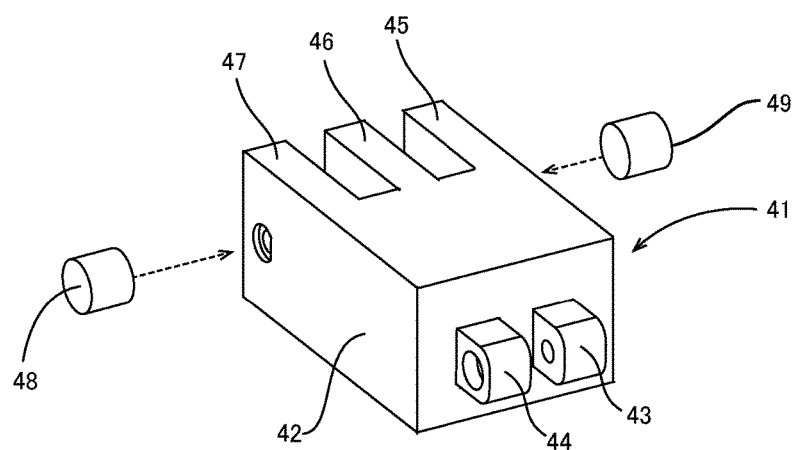
FIG. 6 is a perspective view showing a block in FIG. 5 obliquely from the front.
Figure 7:
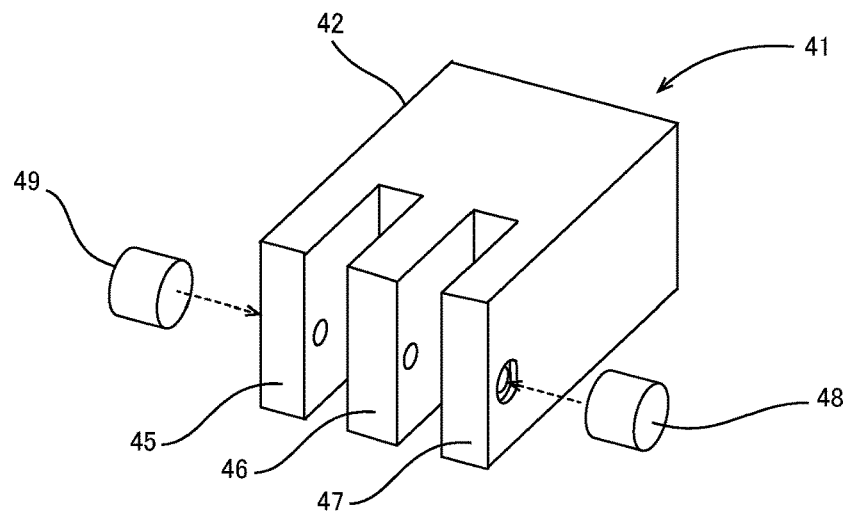
FIG. 7 is a perspective view showing a block in FIG. 5 obliquely from the rear.

As shown in FIGS. 6 and 7, the block 41 has a block body 42. The block body 42 has an approximately rectangular parallelepiped shape. At the front end of the block body 42, two bearings 43 and 44 protruding forward are provided apart from each other in the width direction. At the rear end of the block body 42, bearings 45, 46, and 47 integrally formed with the block body 42 are provided apart from each other in the width direction. The shaft holes of the bearings 43 and 44 at the front end of the block body 42 and the shaft holes of the bearings 45, 46, and 47 at the rear end of the block body 42 are positioned at the height center of the block body 42. The bearing 43 at the front end of one block 41 of two adjacent blocks 41 is fitted between the bearings 44 and 45 at the rear end of the other block 41, the bearing 44 at the front end of one block 41 is fitted between the bearings 45 and 46 at the rear end of the other block 41, and a coupling shaft (not shown) is inserted into the successive holes. As a result, the two adjacent blocks 41 are rotatably coupled at the height center. The blocks 41 are connected in a row along a direction orthogonal to the coupling shaft (coupling direction).

In order to ensure the rigidity of the block row 40 linearly aligned while improving the smoothness of the feeding operation and pulling back operation of the block row 40, the block body 42 is configured such that, while the block row 40 is linearly aligned, the end surfaces of two blocks 41 abut against each other, restricting further upward rotation and permitting downward rotation.

A pair of cam followers 48 and 49 which roll on the guide rails 13 and 14 provided inside the housing 10 are provided in a protruding manner on both side surfaces of the block body 42.

Figure 8:
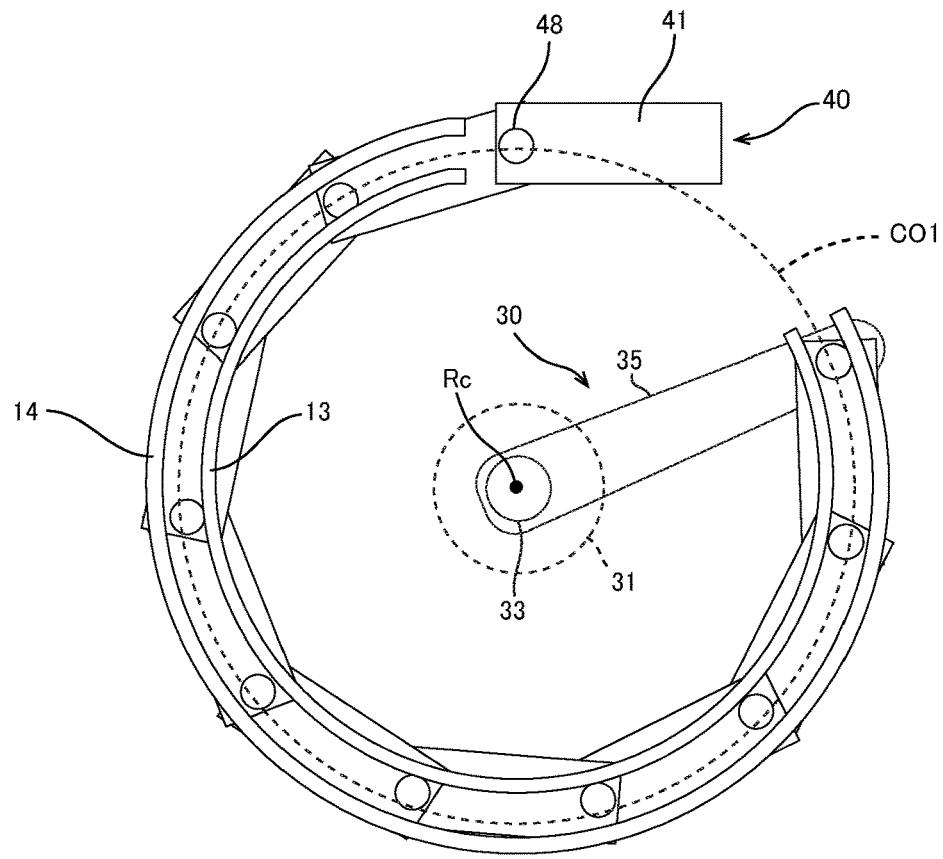
FIG. 8 is a side view showing the linear motion arm in a state of being accommodated in the housing along guide rails.

The cam followers 48 and 49 are arranged so that the outer ring rotary shaft of the cam follower 48 (49) and the coupling shaft for coupling blocks 41 are both arranged on a circle CO1 centered on the housing center Re in a side view as shown in FIG. 8 so that the block row 40 can smoothly move along the circular arc trajectory. Typically, the cam followers 48, 49 are attached to the block body 42 so that their respective outer ring rotary shafts are coaxial with the coupling shaft of the block 41. Accordingly, the block row 40 smoothly moves along the circular arc trajectory into the housing 10 by being regulated by the guide rails 13 and 14.

The distal end of the rotary arm 35 is connected to the rearmost block 41 on the circle CO1 on which the coupling shafts of the block row 40 accommodated in a circular arc shape around the housing center Rc inside the housing 10 are aligned. Specifically, the distal end of the rotary arm 35 has a bearing structure similar to that of the front end of the block 41. The distal end of the rotary arm 35 is fitted between the bearings 45, 46, and 47 at the rear end of the rearmost block 41, and a shaft is inserted into the successive shaft holes. The distal end of the rotary arm 35 is thereby rotatably connected to the rearmost block 41.

The play of the coupling shaft between blocks or the like may cause rattling of the block row 40 and change the orientation of the rearmost block 41 with respect to the housing center Rc. Since the rotary arm 35 and the rearmost block 41 are not fixed with respect to each other, the rotary arm 35 can follow the change in the orientation of the rearmost block 41. This contributes to improving the smoothness of the feeding operation and pulling back operation of the block row 40.

In addition, since the distal end of the rotary arm 35 is connected to the rearmost block 41 on the same circle CO1 as the coupling shafts of the block row 40, the loading direction of the load received by the block 41 from the rotary arm 35 can be aligned with the coupling direction orthogonal to the coupling shafts, thereby realizing the feeding operation and pulling back operation of the block row 40 by the rotary arm 35 while suppressing the rattling of the block row 40 in the height direction (up-down direction).

Further, the distal end of the rotary arm 35 is inserted between the guide rail 13 provided on the inner surface of one side plate of the housing 10 and the guide rail 13 provided on the inner surface of the other side plate, and is connected to the rearmost block 41 of the block row 40. Since the distal end of the rotary arm 35 can be connected at the height center and width center of the rearmost block 41, the feeding operation and pulling back operation of the block row 40 by the rotary arm 35 can be realized while suppressing the rattling of the block row 40 in the width direction (left-right direction), compared to the case where the distal end of the rotary arm 35 is connected at the side of the rearmost block 41.

As long as the block 41 can move along the guide rails 13 and 14, protrusions 48 and 49 engaged with the guide rails 13 and 14 are not limited to the cam followers. As the protrusions 48 and 49, rolling bodies that roll on the rail surfaces or sliding bodies that slide on the rail surfaces may be employed as appropriate. As the rolling bodies, various types of bearings such as cylindrical, needle-like, rod-like, conical, and spherical bearings can be used. As the sliding bodies, a cylindrical body, a rod-like body, and the like in which at least a surface in contact with the guide rails 13 and 14 is made of a self-lubricating resin can be used.

The accommodating structure is not limited to that in the present embodiment as long as the block row 40 can be accommodated along the circular arc trajectory. In the present embodiment, the cam followers 48 and 49 attached to the block 41 are regulated by the guide rails 13 and 14 provided on the inner surfaces of the side plates of the housing 10, but the cam followers 48 and 49 may be fitted into circular arc shaped grooves provided in the inner surface of the housing 10 to be regulated. Further, the block 41 may be directly regulated and accommodated along the circular arc trajectory without being provided with the cam followers 48 and 49.

The linear motion arm 20 according to the present embodiment is not limited to the one having a telescopic structure. For example, the linear motion arm 20 may be composed of a plurality of cascaded linear motion guide mechanisms. A base supporting a rail of the rearmost linear motion guide mechanism among the plurality of linear motion guide mechanisms is horizontally fixed to the mount plate 19, and the head block 41 of the block row 40 is connected to a slider of the head linear motion guide mechanism. As the block row 40 moves forward and backward, the linear motion arm composed of the plurality of linear motion guide mechanisms is extended and contracted.

While some embodiments of the present invention have been described, these embodiments have been presented as examples, and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

The invention claimed is:

1. A linear motion mechanism comprising:
   a plurality of linear motion elements assembled telescopically in multiple stages;
   a block row including a plurality of blocks coupled in a row, a head block among the plurality of blocks being connected to a head linear motion element among the plurality of linear motion elements;
   an accommodating portion configured to accommodate the block row in a circular arc shape;
   a torque generating unit configured to generate torque for feeding the block row from the accommodating portion in order to extend the linear motion elements and pulling back the block row to the accommodating portion in order to contract the linear motion elements; and
   an arm for transmitting the torque generated by the torque generating unit to the block row, wherein:
   a rotary shaft of the torque generating unit is arranged at a circular arc center of the accommodating portion;
   one end of the arm is connected to the rotary shaft of the torque generating unit, and another end thereof is connected to a rearmost block among the plurality of blocks;

the block row is accommodated along the circular arc shape around the circular arc center with less than 360° angle inside the accommodating portion;

the arm has a rod-shape whose an entire length is equal to a distance between the circular arc center and the block row wound around the circular arc center; and the another end of the arm is connected to the rearmost block, at a height and width center of the rearmost block.

2. The linear motion mechanism according to claim 1, wherein coupling shafts of the block row accommodated in the accommodating portion are positioned on a same circular arc, and the another end of the arm is connected to the rearmost block on the circular arc on which the coupling shafts of the block row accommodated in the accommodating portion are aligned.

3. The linear motion mechanism according to claim 1, wherein the another end of the arm and the rearmost block are rotatably connected.

4. The linear motion mechanism according to claim 1, wherein the accommodating portion includes a first member for regulating the block row from one side and a second member for regulating the block row from another side in order to accommodate the block row in the circular arc shape, and the another end of the arm is inserted between the first and second members.

* * * * *